US009945465B2

(12) United States Patent
Meixner et al.

(10) Patent No.: US 9,945,465 B2
(45) Date of Patent: Apr. 17, 2018

(54) DIFFERENTIAL GEAR FOR A DRIVE AXLE OF A MOTOR VEHICLE

(71) Applicant: AUDI AG, Ingolstadt (DE)

(72) Inventors: Christian Meixner, Ingolstadt (DE); Karin Vogtherr, Karlshuld (DE)

(73) Assignee: AUDI AG, Ingolstadt (DE)

( * ) Notice: Subject to any disclaimer, the term of this patent is extended or adjusted under 35 U.S.C. 154(b) by 0 days.

(21) Appl. No.: 14/911,779

(22) PCT Filed: Jul. 30, 2014

(86) PCT No.: PCT/EP2014/002083
§ 371 (c)(1),
(2) Date: Feb. 12, 2016

(87) PCT Pub. No.: WO2015/022053
PCT Pub. Date: Feb. 19, 2015

(65) Prior Publication Data
US 2016/0186849 A1 Jun. 30, 2016

(30) Foreign Application Priority Data
Aug. 16, 2013 (DE) .......................... 10 2013 013 693

(51) Int. Cl.
*F16H 48/22* (2006.01)
*F16H 48/08* (2006.01)
(Continued)

(52) U.S. Cl.
CPC ............. *F16H 48/22* (2013.01); *F16H 48/08* (2013.01); *F16H 48/30* (2013.01); *F16H 48/32* (2013.01); *F16H 48/34* (2013.01); *F16H 48/295* (2013.01)

(58) Field of Classification Search
CPC .......... F16H 48/22; F16H 48/08; F16H 48/30; F16H 48/32; F16H 48/34; F16H 48/295
See application file for complete search history.

(56) References Cited

U.S. PATENT DOCUMENTS 4,976,667 A * 12/1990 Goscenski, Jr. ........ F16H 48/08
475/234
5,030,181 A 7/1991 Keller
(Continued)

FOREIGN PATENT DOCUMENTS

CN 1190164 A 8/1998
CN 101737478 A 6/2010
(Continued)

OTHER PUBLICATIONS

International Search Report issued by the European Patent Office in International Application PCT/EP2014/002083 on Jul. 30, 2014.
(Continued)

*Primary Examiner* — Derek D Knight
(74) *Attorney, Agent, or Firm* — Henry M. Feiereisen LLC

(57) ABSTRACT

The invention relates to a differential gear for a drive axle of a motor vehicle, having a driven differential case (12), which has effect on a carrier (24), particularly on a driving pin, via a coupling block (26) that is guided in a rotationally fixed but axially movable manner, on which carrier (24) planetary wheels (22) are mounted which interlock with outputting output wheels (20), wherein the output wheels (20) output on output shafts (16, 18) on both sides, and having a torque-dependent locking device for shifting the driving torque by means of at least one coupling device (28) integrated in the differential case (12), which coupling device (28) can additionally be actuated via at least one actuator (34; 44), independently of the driving torque. According to the invention, the at least one actuator (34; 44) is arranged in the region of at least one of the output shafts (16, 18) and has effect on the coupling device (28) by means of at least one transfer means (38, 40).

19 Claims, 3 Drawing Sheets

(51) Int. Cl.
*F16H 48/30* (2012.01)
*F16H 48/32* (2012.01)
*F16H 48/34* (2012.01)
*F16H 48/295* (2012.01)

(56) References Cited

U.S. PATENT DOCUMENTS

| | | | |
|---|---|---|---|
| 5,092,825 A | | 3/1992 | Gocsenski, Jr. et al. |
| 5,161,636 A * | | 11/1992 | Haupt .................. B60K 17/348 180/248 |
| 5,531,653 A * | | 7/1996 | Barnholt ................ F16H 48/08 475/234 |
| 6,354,978 B1 * | | 3/2002 | Brackin ................. F16H 48/08 475/234 |
| 6,561,939 B1 * | | 5/2003 | Knapke .................. F16H 48/22 475/231 |
| 6,620,072 B1 | | 9/2003 | Salg |
| 8,727,927 B2 | | 5/2014 | Meixner |

FOREIGN PATENT DOCUMENTS

| | | |
|---|---|---|
| CN | 102829152 A | 2/2012 |
| DE | 38 08 066 | 9/1988 |
| DE | 37 38 280 | 6/1989 |
| DE | 103 10 713 A1 | 9/2003 |
| DE | 203 12 418 | 1/2005 |
| DE | 102012014004 | 4/2013 |
| EP | 0 090 944 | 12/1983 |
| EP | 1 188 006 | 3/2002 |
| GB | 2 138 083 | 10/1984 |
| WO | WO 2013/056691 | 4/2013 |

OTHER PUBLICATIONS

Chinese Search Report issued by the Chinese Patent Office dated Apr. 28, 2017 in Chinese Application No. 2014800452878.
English translation of Chinese Search Report issued by the Chinese Patent Office dated Apr. 28, 2017 in Chinese Application No. 2014800452878.

* cited by examiner

DIFFERENTIAL GEAR FOR A DRIVE AXLE OF A MOTOR VEHICLE

CROSS-REFERENCES TO RELATED APPLICATIONS

This application is the U.S. National Stage of International Application No. PCT/EP2014/0027083, filed Jul. 30, 2014, which designated the United States and has been published as International Publication No. WO 2015/022053 and which claims the priority of German Patent Application, Serial No. 10 2013 013693.8, filed Aug. 16, 2013, pursuant to 35 U.S.C. 119(a)-(d).

BACKGROUND OF THE INVENTION

The present invention relates to a differential gear for a drive axle of a motor vehicle.

A generic differential gear is known, for example, from WO/2013/056691A1, and includes a differential case having integrated therein two multi-disk clutches which produce in a "torque-sensitive" manner a self-locking effect in dependence on the driving torque. In addition, provision is made for an electromechanical actuator which is mounted on the differential case and by which a locking effect can be superimposed in a software-controlled manner. This results in further, advantageous control intervention options, in particular in terms of driving dynamics, independently of the applied driving torque.

SUMMARY OF THE INVENTION

Based on the differential gear of a type involved here, it is object of the invention to configure it structurally robust and to better suit it to installation conditions at hand.

This object is achieved by a differential gear for a driving axle of a motor vehicle, including a driven differential case which acts via coupling block that is guided in fixed rotative engagement but axially movable on a carrier, in particular a driven pin, to which planet gears are mounted which mesh with driving output pears, with the output pears being in driving relation with output shafts on both sides, and a torque-dependent locking device for shifting the drive torque by at least one coupling device integrated in the differential case and additionally acted upon by at least one actuator independently of the drive torque, wherein the at least one actuator is arranged in the region of at least one of the output shafts and acts on the coupling device via at least one transfer means.

Particularly advantageous and suitable refinements of the invention are subject matter of the dependent claims.

According to the invention, it is proposed that the at least one actuator is arranged in the region of one of the output shafts, preferably arranged on a flange of an output shaft of the differential gear, configured as driving stub shaft, and acts upon the coupling device with at least one transfer means.

It can be particularly preferably to provide in the differential case of the differential, constructed preferably as a bevel gear differential, two coupling devices formed in particular by multi-disk clutches, which are positioned on both sides of the carrier which carries the planet gears and is arranged in the axially movable clutch block, with the actuator acting solely on one of the coupling devices in a functionally simple manner.

Furthermore, provision may be made inside the output shaft for a rod, preferably a tie rod, and a support tube radially outside thereto as transfer means, which are operated by the actuator in opposite directions to act directly or indirectly upon a support disk of the coupling device, on one hand, and upon the carrier, formed for example by a driving pin, on the other hand. This arrangement enables support of the tensile and compressive forces as inner force while reducing bearing complexity and parts number, and transmission of precise adjustment forces.

The rod, preferably formed as tie rod, and the support tube can be actuated via a ball-ramp system which, for example, is electromagnetically adjustable and has adjustment disks, so that relatively small actuation forces result which can be applied, for example by using a small, lightweight electromagnet.

As an alternative, the rod, preferably formed as tie rod, and the support tube can be acted upon in opposite directions, for example hydraulically or, optionally, pneumatically, via a linear adjustment device, for example a piston-cylinder unit. A pressure source, preferably already existing in the motor vehicle, may hereby be used via interposition of a respective control valve, or provision may be made for an autonomous, electrically-operated hydraulic pump.

Furthermore, in order to achieve a smooth and precise actuation, it is proposed to support the rod, preferably formed as tie rod, and the support tube inside or outside of the stub shaft via bearings, for example axial bearings, and to act via these upon the coupling device, formed as multi-disk clutch.

Finally, it can be especially preferred when the actuator is connected to an electronic driving program control of the motor vehicle and activates, superimposed to the driving torque, the locking device in the presence of defined driving conditions of the motor vehicle in a defined manner. Control parameters may involve in particular the starting of the vehicle and/or negotiation of curves, wherein already existing parameters such as vehicle speed, steering angle, lateral acceleration, load demand, etc. can be considered in the driving program control accordingly.

BRIEF DESCRIPTION OF THE DRAWING

Several exemplary embodiments of the invention are explained in more detail hereinafter with reference to the accompanying drawings. It is shown in.

DETAILED DESCRIPTION OF THE PREFERRED EMBODIMENTS

Figure 1:
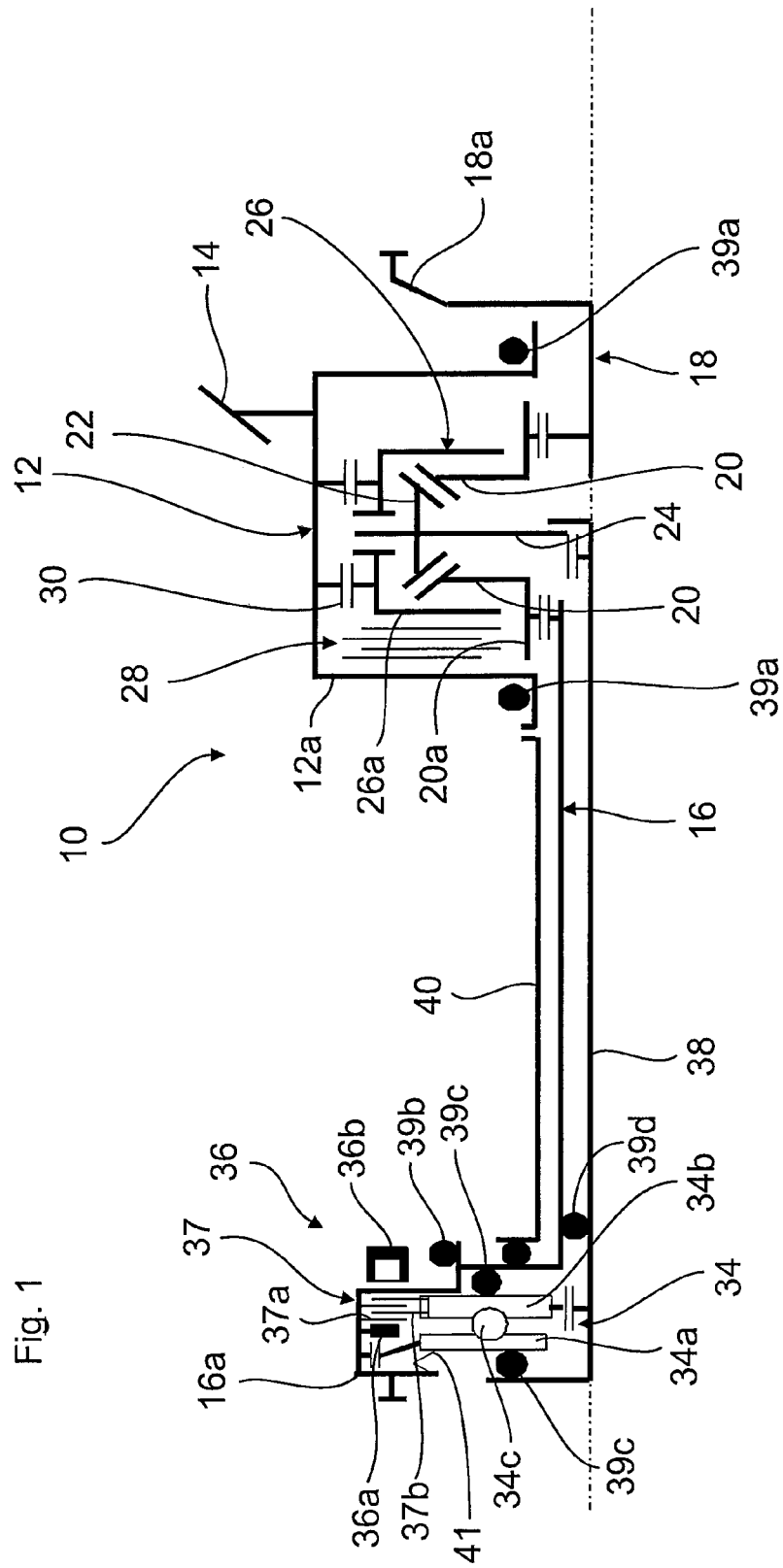
FIG. 1 a schematic illustration of half of a differential gear for a drive axle of a motor vehicle, with a multi-disk clutch as "torque-sensitive" locking device and an electromagnetic actuator which is operably connected to the multi-disk clutch and which is arranged on one of the stub shafts of the differential gear and acts on the multi-disk clutch via a tie rod and a support tube.

FIG. 1 shows schematically a bevel gear differential 10 for a drive axle (front or rear axle) of a motor vehicle, which is rotatably supported in a differential case, not shown, and has a ring gear 14 as the driving element that is fixed to a differential case 12, and two stub shafts 16, 18 as output elements.

The stub shafts 16, 18 are connected via flanges 16a, 18a in driving relation with driving cardan shafts or the wheels of the drive axle. Furthermore, the stub shafts 16, 18, projecting into the differential case 12, carry the axle bevel gears 20 of the differential 10, which, in turn, mesh with the planet gears 22 that are constructed as bevel gears.

The planet gears 22 are rotatably supported on a driving pin 24 which is fixed on diametrically opposite sides in a drum-shaped coupling block 26. The coupling block 26 is guided in the differential case 12 for axial displacement via axis-parallel teeth (at 30) and has a pressure disk 26a to act upon a coupling 28, positioned within the differential case 12 and referred to hereinafter by way of example as a multi-disk clutch 28. Optionally, multi-disk clutches 28 may also be provided on both sides of the differential case 12.

The disks (without reference signs) of the multi-disk clutch 28, acting as a locking device, are connected in driving relation via axis-parallel teeth in rotation direction in formfitting manner and alternatingly with the differential case 12 or a hub portion 20a of the corresponding axle bevel gear 20 and supported on the end wall 12a of the differential case.

By closing the multi-disk clutch 28, the driving differential case 12 is coupled to the axle bevel gear 20 of the stub shaft 16 and consequently the differential action is no longer effective and the locking device is active.

This may be implemented in dependence on the driving torque in a "torque-sensitive" manner via the movable coupling block 26 and the pressure disk 26a and/or controlled via an actuator 34.

The electromagnetic actuator 34 is hereby structurally positioned on the flange 16a of the stub shaft 16 via an electromagnet 36, interacting with an adjustment disk 34b, a ball-ramp system 34c, and a further adjustment disk 34a.

Specifically, the electromagnet 36 includes here a conjointly rotating armature 36a and housing-fixed coil 36b. A primary clutch or multi-disk clutch 37 is situated between these two halves of the electromagnet 36 and has outer disks 37a which are connected with the stub shaft 16 on the left-hand side in the drawing plane and thus with the axle bevel gear 20 on the left-hand side in the drawing plane. It is evident that this arrangement may also be configured equally well at any other appropriate location in this way.

The inner disks 37b are connected in fixed rotative engagement via, for example, a plug toothing of the adjustment disk 34b with the tie rod 38, arranged within the stub shaft 16, and via the plug toothing with the differential or driving pin 24 and thus with the differential case.

In an ideal straight-ahead travel, the differential rotates in the block. The rotation speeds of the axle bevel gears are then identical with the rotation speed of the differential cage. This means the absence of a rotation speed differential in the primary clutch 37 so that the tie rod 38 rotates at the same rotation speed as the stub shaft 16. When now applying current to the electromagnet 36 to thereby actuate the primary clutch 37 electromagnetically, the ball ramp 34c would lack any spreading effect because of the absence of a rotation speed differential between the adjustment disk 34b, which rotates with the rotation speed of the tie rod 38, and the adjustment disk 34a, which rotates with the rotation speed of the stub shaft 16.

In order for the ball-ramp principle to work, the presence of a rotation speed differential is mandatory between the adjustment disks 34a, 34b, because otherwise the ball cannot start to run and no spreading effect can develop.

In the event of cornering or in a so-called non-ideal driving state, when a slight rotation speed differential already exists between a differential output, for example left/right stub shaft or front/rear axle, the differential distributes spontaneously a torque so that a different rotation speed is applied on the axle bevel gears than on the differential cage. The inner disk set 37b rotates in the primary clutch 37 at a different rotation speed than the outer disk set 37a. When applying current to the electromagnet 36, the adjustment disk 34b, which has the rotation speed of the tie rod 38, the driving pin 24 and the differential cage, is decelerated or accelerated to the rotation speed of the left stub shaft and thus the rotation speed of the left axle bevel gear via the disk set of the primary clutch 37. As a result, the balls of the ball ramp 34 roll within the ramp and cause a spreading effect between the right-hand adjustment disk 34b and the left-hand adjustment disk 34a. This spreading force acts here from the left adjustment disk 34a via the tie rod 38, the driving pin 24 and the pressure disk 26a upon the coupling 28 in the differential. As a result of the torque-sensitive effect of the differential, this disk set of the coupling 28 is being pressed already by an input torque and is being pressed even further by the actuation force applied by the ball ramp. Thus, the non-ideal driving state can be negotiated even more dynamic.

Further shown in FIG. 1 are various bearings, for example the bearings 39a for support of the differential case in the differential flange cover. Furthermore, the bearing 39b for support of the left stub shaft in the case. The bearings 39c involve axial bearings, whereas the bearing 39d involves a radial bearing.

Furthermore, the adjustment disk 34a on the left-hand side of the drawing plane is in addition acted upon by a return spring 41.

Figure 2:
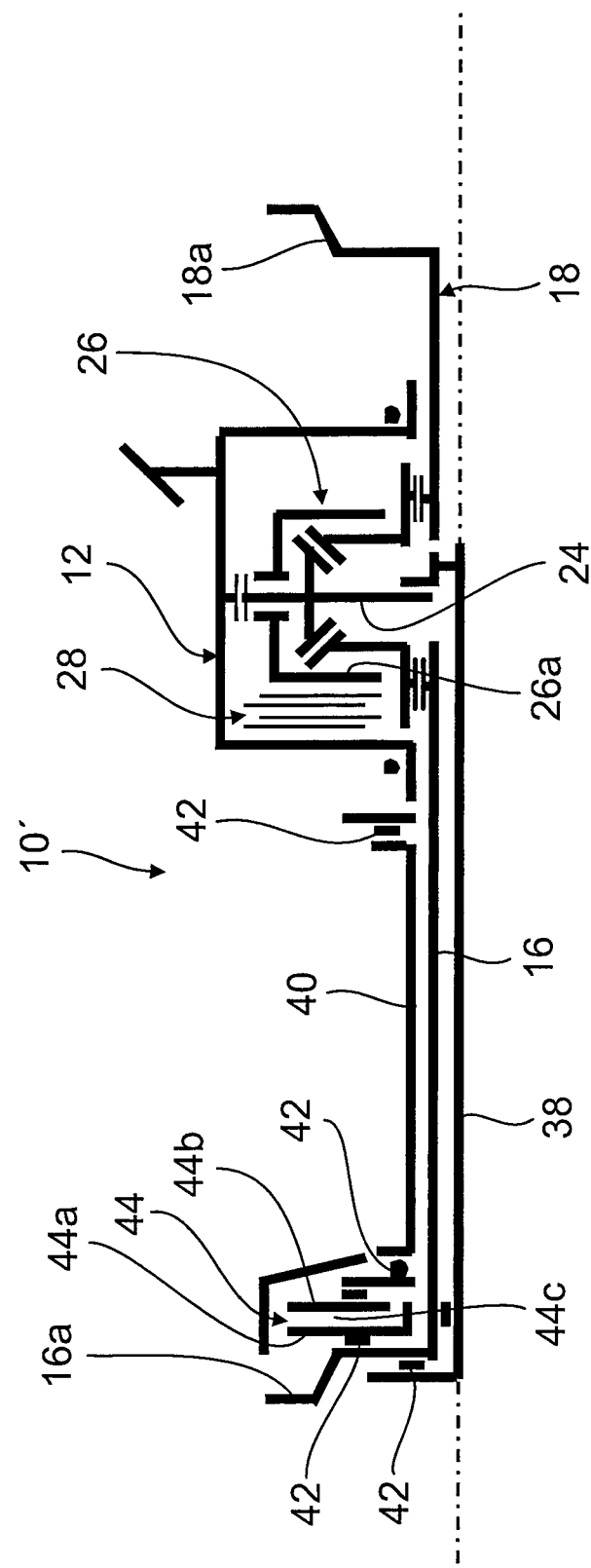
FIG. 2 a differential gear as an alternative to the one of FIG. 1 with a hydraulically controlled actuator.

The exemplary embodiment according to FIG. 2 differs from the one of FIG. 1 especially in that the actuator 44 in the differential gear 10' (cf. also FIG. 3) is operated hydraulically and actuated, with two annular pistons 44a, 44b of a respective piston-cylinder unit being provided which are movable in relation to one another and delimit a common cylinder space 44a and which act on the tie rod 38 and on the support tube 40, as described above.

Figure 3:
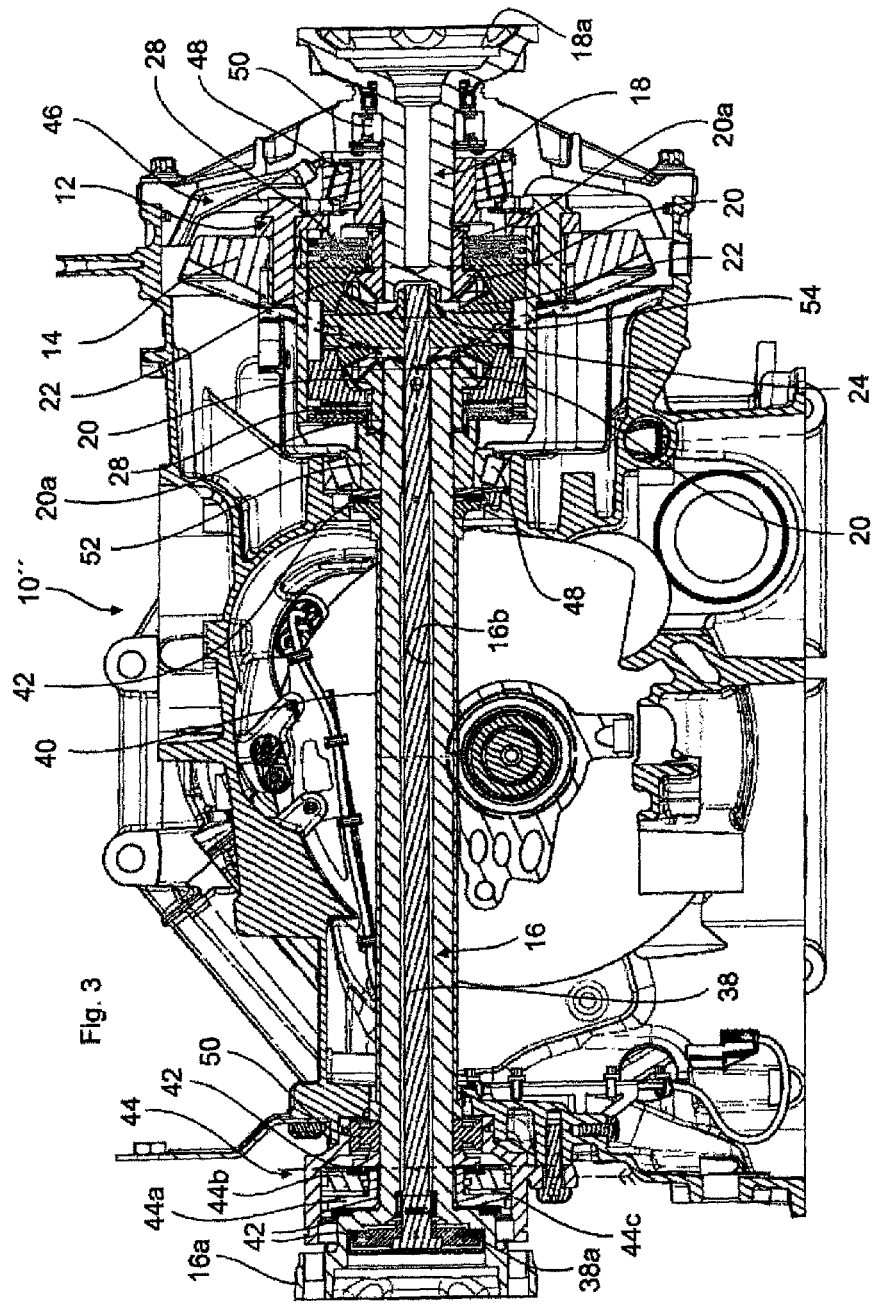
FIG. 3 a schematic illustration of a bevel differential gear with a longitudinal section through the stub shafts, showing multi-disk clutches arranged on both sides of the bevel gears and a driving pin and a hydraulically-operated actuator.

FIG. 3 shows a differential gear 10'' in more detail, which corresponds substantially to the one in FIG. 2 and is described only insofar as this is necessary for the understanding of the present invention. Functionally identical parts are provided with same reference signs.

FIG. 3 shows partly the axle housing 46 in which the differential case 12 of the bevel gear differential 10'' is held axially immobile via bilateral tapered roller bearings 48. The stub shafts 16, 18 which carry the axle bevel gears 20 via a sliding toothing are further rotatably supported on the output side via ball bearings 50 in the axle housing 46.

Arranged on both sides of the coupling block 26 are two multi-disk clutches having disks which, as described above, are respectively connected in driving relation via appropriate toothings with the coupling block 26, on one hand, and the hub portions 20a of the axle bevel gears 20, on the other hand.

The left-hand multi-disk clutch 28 may further be acted upon by the hydraulically operable actuator 44 as follows:

The actuator 44, which can be connected to a not shown pressure source, is comprised, similar to FIG. 2, of two annular pistons 44a and 44b immediately adjacent to the flange 16a, which are movable in relation to one another on the stub flange 16 and guided in the axle housing 46 and which are guided in the axle housing 46 for axial displacement and delimit a common cylinder space 44c. The cylinder space 44c can receive hydraulic fluid via channels (not shown) integrated in the axle housing 46.

The annular piston 44a is mounted on the stub shaft 16 and acts via a first axial bearing 42 upon the flange 16a and via the latter via a second axial bearing 42 on a cup 38a within the flange 16a, which in turn interacts by formfit with the tie rod 38 which is guided for axial displacement, in a central bore 16b of the stub shaft 16.

The tie rod 38 acts conversely via interposition of a pressure piece 54 upon the driving pin 24 of the bevel gear differential or coupling block 26.

Furthermore, the annular piston 44b acts via a first axial bearing 42 indirectly on the support tube 40 which rests rotationally decoupled via a further axial bearing 42 upon a hub-shaped coupling body 52 which acts as support disk on the left-hand multi-disk clutch 28.

Accordingly, the radially outer support tube 40 can rotate with the stub shaft 16 and resists the pressure forces, encountered when the left-hand multi-disk clutch 28 is actuated, via the coupling bodies 52, whereas the tie rod 38, rotationally decoupled from the stub shaft 16, acts upon the left-hand multi-disk clutch 28 via the coupling block 26 which is axially movable in relation to the differential case 12.

The two multi-disk clutches 28 can thus be acted upon "torque-sensitively" via the coupling block 26 at different input and output torques, and in addition or as an alternative, the left-hand multi-disk clutch 28 can be more or less activated via the actuator 44 with the support tube 40 and the tie rod 38 as transfer means for locking the differential action.

The electric or hydraulic activation of the actuator 34 or 44 may be realized preferably via an electronic driving stability program (not shown) of the motor vehicle, which as a function of travel-specific data, such as vehicle speed, load signal, steering angle, lateral acceleration, etc, controls the additional actuation of the multi-disk clutch 28. This has advantages in terms of driving dynamics, i.a., when staring the motor vehicle, negotiating curves, and sudden load changes, in particular when sporty, high-power motor vehicles are involved.

The invention claimed is:

1. A differential gear for a driving axle of a motor vehicle, comprising:
   a carrier;
   planet gears mounted to the carrier and meshing with output gears in driving relation with output shafts on both sides of the carrier;
   a driven differential case;
   a coupling block guided in fixed rotative engagement but axially movable in the differential case, said differential case configured to act via the coupling block on the carrier;
   two coupling devices integrated in the differential case and operating as torque-dependent locking devices to shift a driving torque;
   at least one actuator operably connected to at least one of the output shafts; and
   at least one transfer unit configured to enable the actuator to act on one of the coupling devices independently of the driving torque,
   wherein said coupling devices are accommodated in the differential case and positioned on both sides of the carrier.

2. The differential gear of claim 1, wherein the carrier is constructed as a driving pin.

3. The differential gear of claim 1, constructed in the form of a bevel gear differential with tapered planet gears as the planet gears and axle bevel gears as the output gears.

4. The differential gear of claim 1, wherein the actuator is arranged on a flange of the one of the output shafts which is configured as stub shaft.

5. The differential gear of claim 1, wherein the actuator acts upon the coupling device via the carrier and the coupling block independently of the driving torque.

6. The differential gear of claim 1, wherein each of the coupling devices is configured as a multi-disk clutch.

7. The differential gear of claim 1, wherein the actuator is connected to an electronic driving program control of the motor vehicle and the locking device is superimposed to the drive torque in the presence of defined driving conditions of the motor vehicle.

8. The differential gear of claim 1, wherein the actuator operates during starting of the motor vehicle and/or cornering.

9. The differential gear of claim 1, wherein the coupling device is formed by a multi-disk clutch.

10. A differential gear for a driving axle of a motor vehicle, comprising:
    a carrier;
    planet gears mounted to the carrier and meshing with output gears in driving relation with output shafts on both sides of the carrier;
    a driven differential case;
    a coupling block guided in fixed rotative engagement but axially movable in the differential case, said differential case configured to act via the coupling block on the carrier;
    at least one coupling device integrated in the differential case and operating as a torque-dependent locking device to shift a driving torque;
    at least one actuator operably connected to at least one of the output shafts; and
    at least one transfer unit configured to enable the actuator to act on the coupling device independently of the driving torque,
    wherein the transfer unit includes a rod disposed inside the one of the output shafts, and a support tube disposed radially outside of the one of the output shafts, with the rod and the support tube being acted upon by the actuator in opposite directions to act directly or indirectly upon a support disk of the coupling device and on the carrier or on the other one of the output shafts.

11. The differential gear of claim 10, wherein the rod is a tie rod.

12. The differential gear of claim 10, wherein the actuator is a linear adjustment device.

13. The differential gear of claim 12, wherein the linear adjustment device is a hydraulic linear adjustment device.

14. The differential gear of claim 12, wherein the linear adjustment device is constructed as a piston-cylinder unit.

15. The differential gear of claim 10, wherein the actuator is a ball-ramp system having adjustment disks for operative connection to the one of the output shafts.

16. The differential gear of claim 15, wherein the ball-ramp system is an electromagnetically adjustable ball-ramp system.

17. The differential gear of claim 10, further comprising a bearing assembly configured to support the rod and the support tube rotationally decoupled inside or outside of the one of the output shafts.

18. The differential gear of claim 17, wherein the bearing assembly includes axial bearings.

19. A method of actuating a differential gear, comprising:
operably connecting a coupling device to output gears of the differential gear in driving relationship with output shafts;
operably connecting an actuator to one of the output shafts via a transfer unit and one of the output gears; and
acting on the coupling device by the actuator to effect a torque-dependent locking action to shift a driving torque via the transfer unit,
wherein the transfer unit includes a rod disposed inside the one of the output shafts, and a support tube disposed radially outside of the one of the output shafts, with the rod and the support tube being acted upon by the actuator in opposite directions to act directly or indirectly upon a support disk of the coupling device and on a carrier or on the other one of the output shafts.

* * * * *